(No Model.) 2 Sheets—Sheet 2.

G. W. DECKER.
PNEUMATIC SULKY.

No. 597,605. Patented Jan. 18, 1898.

Inventor
George W. Decker

Witnesses
By his Attorneys,

UNITED STATES PATENT OFFICE.

GEORGE W. DECKER, OF ROCHESTER, NEW YORK.

PNEUMATIC SULKY.

SPECIFICATION forming part of Letters Patent No. 597,605, dated January 18, 1898.

Application filed March 31, 1897. Serial No. 630,130. (No model.)

*To all whom it may concern:*

Be it known that I, GEORGE W. DECKER, a citizen of the United States, residing at Rochester, in the county of Monroe and State of New York, have invented a new and useful Pneumatic Sulky, of which the following is a specification.

This invention relates to pneumatic sulkies, its objects being to simplify, cheapen, and otherwise improve the construction of devices of this character, whereby they will be lighter, stronger, will offer less wind resistance, and afford the horse more space for hock action when at full speed.

With these and other objects in view the invention consists of the several details of construction and combination of parts hereinafter fully set forth, and particularly pointed out in the claims.

Figure 1:
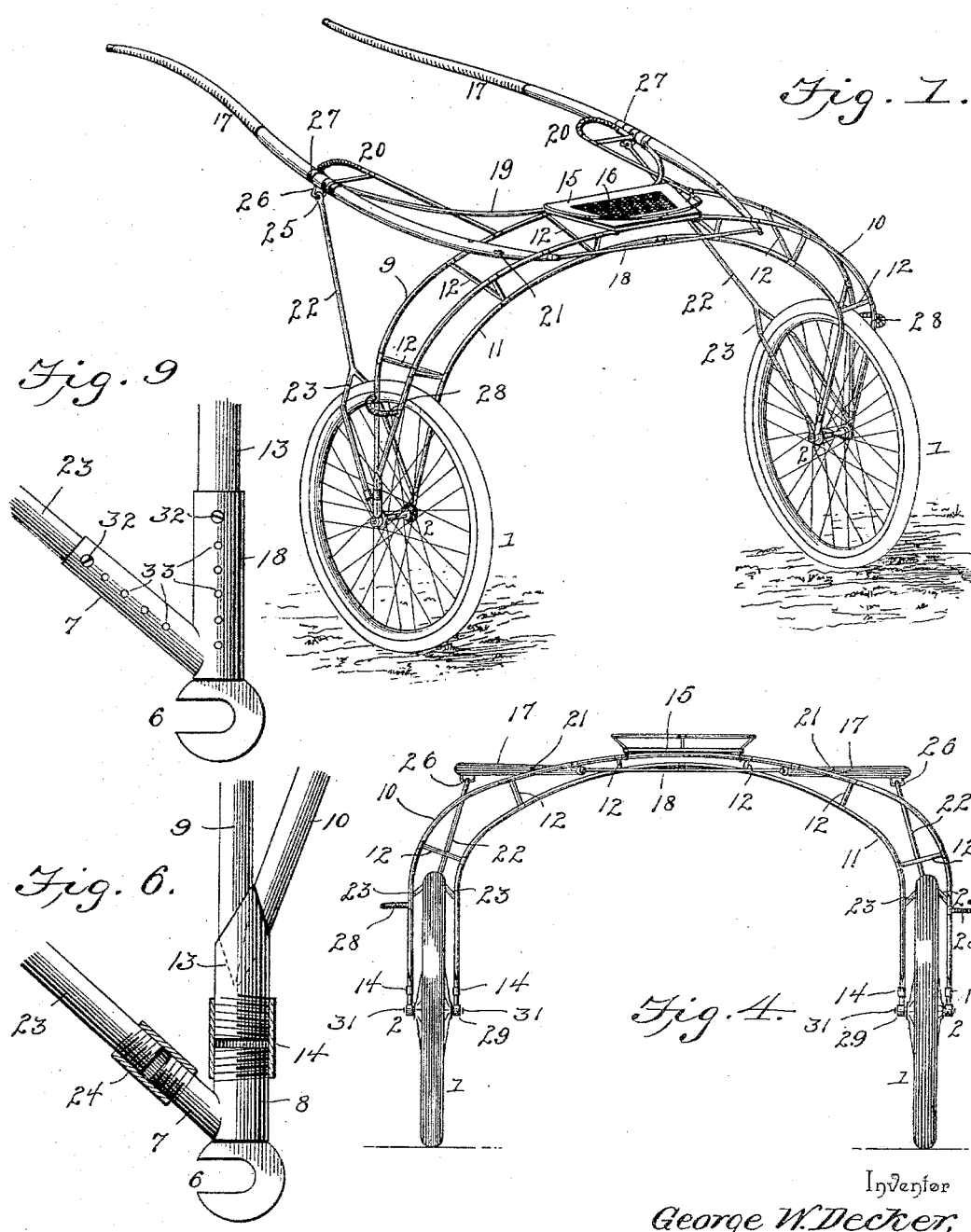
Figures 2, 3:
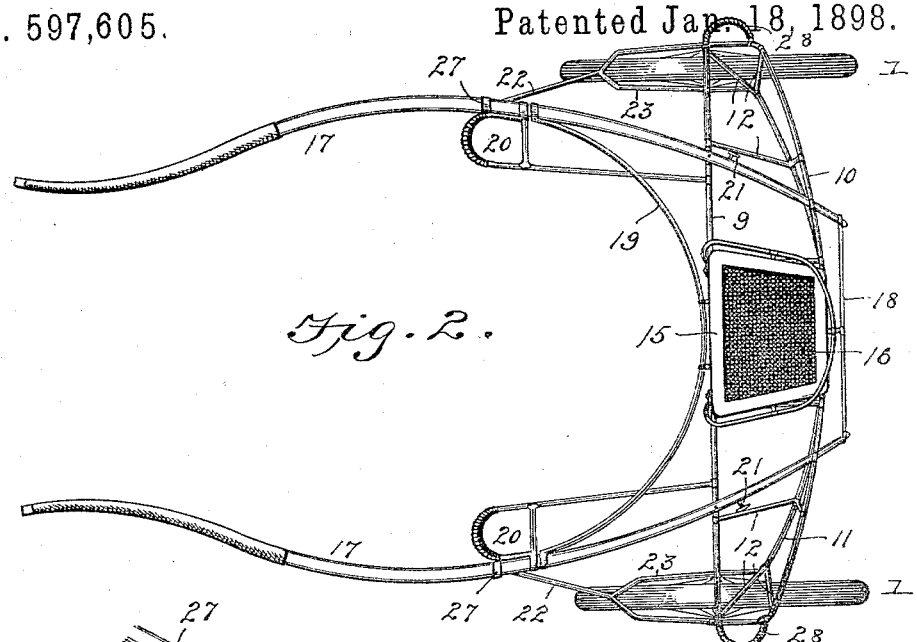
Figure 8:
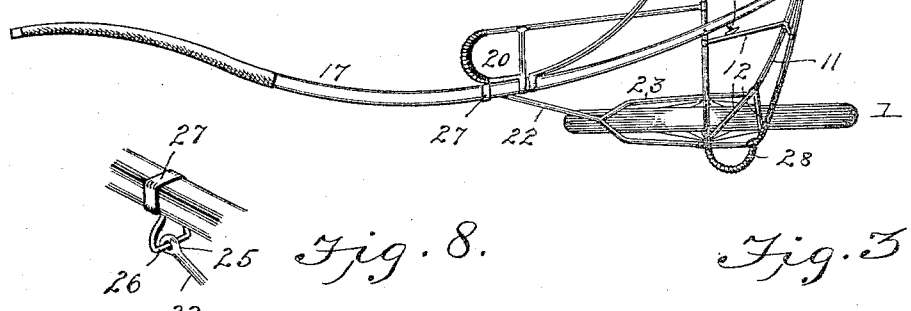
Figures 5, 7:
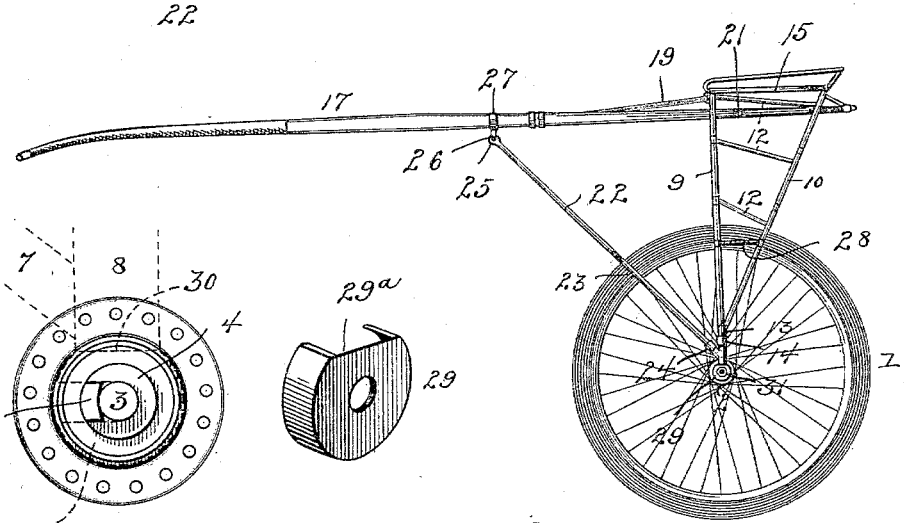

In the drawings, Figure 1 is a perspective view of a sulky made in accordance with my invention. Fig. 2 is a plan view of the same. Fig. 3 is a side elevation. Fig. 4 is a rear view. Figs. 5, 6, 7, and 8 are views of detached details. Fig. 9 is a view of a modification.

Similar reference-numerals indicate similar parts in the several figures.

The wheels are indicated by 1, and their hubs by 2. The axles are marked 3, and 4 indicates the cones on the axle, which form part of a ball-bearing between the hub and axle. Each cone is provided at its outer face with a lug 5. A draw-hook 6 fits over each end of each axle, and the lugs 5 on the cones fit in between the open ends of the hooks. Each of these hooks is provided with two diverging shanks or arms 7 and 8, which will preferably be threaded.

The frame consists of three tubular arches 9, 10, and 11, which are connected together by braces 12 at suitable intervals. The ends of the outer arches 9 and 10 are welded or otherwise rigidly connected to a threaded stem 13, and a sleeve 14, having right and left hand threads at its opposite ends, connects the stem 13 to the shank 8 of the hook 6 on the outer end of each axle. By this arrangement the connection between the arches 9 and 10 and the hook 6 on the outer ends of the axles may be adjusted as circumstances require. The ends of the inner arch 11 are similarly connected to the arms 8 of the hook 6 on the inner ends of the axles by similar sleeves 14.

The upper front arch 9 extends in a straight line across from wheel to wheel; but the upper rear arch 10 gradually diverges rearwardly from the arch 9, and a space is thus formed between the upper ends of the arches for the seat-frame 15, which is attached to the arches by clips or other suitable devices. Leather or any other suitable material is supported by the frame 15 to form a seat 16 for the driver.

The inner or lower arch 11, which extends across from the inner ends of the axles, is arranged to be directly under the upper rear arch 10, and the upper middle portions of these arches are brought nearer together than their end portions. The object of arranging the inner arch in this manner is, first, to strengthen the rear upper arch where the seat is located, because most of the driver's weight is directly over the rear arch, and, second, to get the inner arch as far away from the horse and have it as high as possible in order that the horse will have plenty of room for movement when at full speed without striking any part of the frame. The advantage arising from this construction is that the seat for the driver may be lower than is possible in any other sulky of this character of which I have knowledge and yet afford plenty of room for the free movement of the horse, and the lower the driver can be seated the less wind resistance will he offer.

The shafts are indicated by 17 and are clipped or otherwise connected to the upper arches 9 and 10, and their rear ends are connected by a rod 18. A curved bar 19 is connected at each end to the respective shafts, and its middle portion is clipped or otherwise firmly connected to the front arch 9. This bar greatly strengthens and stiffens the frame and the shafts.

The stirrups or foot-rests for the driver are indicated by 20, and 21 indicates hooks to which the traces are connected. These hooks may be screwed into the shafts or otherwise attached to them at any desired point, and by using them I am enabled to dispense with the whiffletree and to simplify the construction of the sulky, reduce the cost of manufacture, and make it lighter.

22 indicates draw-braces which are in the form of forks. The fork members 23 extend on opposite sides of the wheel and are threaded at their ends, and these threaded ends are connected to the shank 7 of the hook 6 on the ends of the axle by sleeves 24, having right and left hand threads at opposite ends. The forward ends of the braces 22 are connected to the respective shafts in such manner that the shafts may have a limited side movement independently of the front ends of the braces. This is necessary in order not to turn the wheels out of proper position when the shafts are sprung together in hitching the horse to the sulky. In order to permit this movement, an eye or slot 25 is formed in the end of the brace, through which eye the bar 26, forming part of a clip 27, passes, and this clip is secured to the shaft. Other means may be devised to permit this independent lateral movement of the shaft, and hence I do not intend to limit myself to the particular devices just described.

28 represents guard-bars, which are curved, as shown, and connected at their ends to the vertical portions of the arches 9 and 10 opposite the upper portions of the wheels. These guard-bars also serve as steps; but their primary object is to prevent interlocking with the wheel of any other sulky in the event of a collision or when running a race on a crowded track.

29 represents a dust-cap which fits over the end of the axle and incloses the cone 4 and the hook 6, which fits over the axle. The hook 6 is flattened, and a shoulder 30 is formed at its junction with the shank 8. The flange of the cap is cut away, as indicated at 29, to bear against the shouldered end 30 of the shank 8. The cap is held in position by a nut 31 on the threaded end of the axle. This cap will effectually exclude dust from the ball-bearings and also strengthen the joint between the hook and the axle.

Instead of connecting the shanks 7 and 8 to the fork members 23 of the braces and the stems 13 by the right and left hand threaded sleeves one of such parts may fit within the other and be secured together by screws 32 in the openings 33, as shown in Fig. 9. A series of openings 33 may be formed in order that the connection may be adjustable.

It will be understood that changes in the form, proportion, and minor details of construction may be resorted to without departing from the spirit or sacrificing any of the advantages of this invention.

Having thus described the invention, what I claim is—

1. In a sulky, a frame formed of three tubular arches, the two outer and upper arches being connected at their ends and spaced at their middle portions, and the inner or lower arch being arranged directly under the rear upper arch with their middle portions closer together than their ends, combined with a series of braces connecting said arches, a seat supported between the upper portions of the outer arches, and connections between the ends of the arches and the wheel-axles, substantially as described.

2. In a sulky, the combination with the tubular arches forming the frame, the wheel-axles, and the shafts, of draw-braces connected to the shafts, hooks fitted in the axle, diverging shanks integral with said hooks, and devices to adjustably connect the diverging shanks to the draw-braces and the ends of the tubular arches, respectively, substantially as described.

3. In a sulky, the combination with the wheel-axle, and the shafts, of a hook fitted on each end of the axle, a stem extending from each hook, a draw-brace connected at its front end to the shaft to permit independent lateral movement of the shaft, the rear end of the brace being forked to straddle the wheel, and means to adjustably connect the ends of the fork members to the shanks on the hooks, substantially as described.

4. In a sulky, the combination of the tubular arches, stems to which the ends of the upper arches are rigidly connected, said stems being threaded, and the ends of the inner arch being also threaded, a hook on each end of each axle provided with a shank having a threaded end, and sleeves having right and left hand threads at their opposite ends to connect the respective shanks to the ends of the arches, substantially as described.

5. In a pneumatic sulky, the combination with the axle and the wheel-hub, of a ball-cone on the axle, having a lug, a shouldered hook fitting over the axle and said lug, a dust-cap fitting over the axle and inclosing the said cone and hook, a portion of the periphery of the cap being cut away to fit under the shoulder of the hook, and a nut on the axle to lock the cap in position, substantially as described.

In testimony that I claim the foregoing as my own I have hereto affixed my signature in the presence of two witnesses.

GEORGE W. DECKER.

Witnesses:
EVELYN L. CLOSE,
WM. K. BARLOW.